(12) United States Patent
Xu et al.

(10) Patent No.: US 12,454,972 B2
(45) Date of Patent: Oct. 28, 2025

(54) FILLER PIECE MOUNTING ASSEMBLY FOR LIFTING COLUMN AND LIFTING COLUMN

(71) Applicant: ZHEJIANG JIECANG LINEAR MOTION TECHNOLOGY CO., LTD., Zhejiang (CN)

(72) Inventors: Xin Xu, Zhejiang (CN); Xinxing Zhao, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 630 days.

(21) Appl. No.: 17/797,726

(22) PCT Filed: Apr. 19, 2021

(86) PCT No.: PCT/CN2021/088229
§ 371 (c)(1),
(2) Date: Aug. 5, 2022

(87) PCT Pub. No.: WO2021/227786
PCT Pub. Date: Nov. 18, 2021

(65) Prior Publication Data
US 2023/0073173 A1    Mar. 9, 2023

(30) Foreign Application Priority Data
May 9, 2020    (CN) .......................... 202010384859.2

(51) Int. Cl.
*F16B 7/14* (2006.01)
*A47B 9/20* (2006.01)

(52) U.S. Cl.
CPC .............. *F16B 7/149* (2013.01); *A47B 9/20* (2013.01); *A47B 2200/0054* (2013.01); *Y10T 403/32501* (2015.01)

(58) Field of Classification Search
CPC ........ F16B 7/14; F16B 7/1427; F16B 7/1463; F16B 7/149; Y10T 403/32467;
(Continued)

(56) References Cited

U.S. PATENT DOCUMENTS 2,865,460 A  * 12/1958 St. John, Jr. ............ B64C 11/40
                                                              92/13
4,277,197 A  *  7/1981 Bingham ................ F16B 7/149
                                                              403/104
(Continued)

FOREIGN PATENT DOCUMENTS

CN        2519040       10/2002
CN       201259078       6/2009
(Continued)

OTHER PUBLICATIONS

"International Search Report (Form PCT/ISA/210) of PCT/CN2021/088229", mailed on Jun. 28, 2021, with English translation thereof, pp. 1-4.

(Continued)

*Primary Examiner* — Amber R Anderson
*Assistant Examiner* — Kevin J Baynes
(74) *Attorney, Agent, or Firm* — JCIPRNET (57) ABSTRACT

Disclosed is a filler piece mounting assembly for a lifting column. The lifting column includes a first casing and a second casing sliding in the first casing. The filler piece mounting assembly includes a resilient filler piece and a fixed frame for fixing the resilient filler piece. The resilient filler piece is disposed outside an outer wall of the second casing and axially fixed relative to the first casing. The fixed frame is disposed at a front end of the first casing and moves relative to the first casing. A first inclined surface is disposed on an outside of the resilient filler piece. The fixed frame includes an extrusion part for extruding the first inclined (Continued)

surface, and the extrusion part extrudes the first inclined surface to radially deform the resilient filler piece to adjust a clearance between the resilient filler piece and the second casing.

15 Claims, 5 Drawing Sheets

(58) Field of Classification Search
CPC ..... Y10T 403/32491; Y10T 403/32501; A47B 9/20; A47B 2200/0051; A47B 2200/0052; A47B 2200/0054
See application file for complete search history.

(56) References Cited

U.S. PATENT DOCUMENTS

| | | | | |
|---|---|---|---|---|
| 4,757,778 | A * | 7/1988 | Scaglia | F16B 7/149 403/109.5 |
| 5,011,104 | A | 4/1991 | Fang | |
| 5,433,551 | A * | 7/1995 | Gordon | F16B 7/149 403/368 |
| 6,123,364 | A * | 9/2000 | Inoue | F16L 19/086 285/391 |
| 6,520,192 | B1 * | 2/2003 | Lo | A45B 19/04 403/109.5 |
| 6,719,331 | B1 * | 4/2004 | Chen | F16B 7/1463 285/391 |
| 6,761,274 | B1 * | 7/2004 | Chen | A47B 45/00 403/109.1 |
| 7,229,054 | B2 * | 6/2007 | Hu | A47C 7/5066 248/188.1 |
| 8,117,787 | B2 * | 2/2012 | Lee | E04G 25/061 403/109.5 |
| 9,574,591 | B2 * | 2/2017 | Kim | F16B 7/149 |
| 9,629,452 | B1 * | 4/2017 | Chen | A47B 9/20 |
| 2015/0320159 | A1 | 11/2015 | Heim | |
| 2016/0377212 | A1 | 12/2016 | Lai | |

FOREIGN PATENT DOCUMENTS

| | | |
|---|---|---|
| CN | 105736443 | 7/2016 |
| CN | 209651842 | 11/2019 |
| CN | 111706584 | 9/2020 |
| CN | 212272827 | 1/2021 |
| DE | 19857456 | 6/2000 |
| GB | 2179090 | 2/1987 |
| WO | 8303450 | 10/1983 |

OTHER PUBLICATIONS

"Office Action of China Counterpart Application", issued on Aug. 30, 2024, with English translation thereof, p. 1-p. 11.
"Search Report of Europe Counterpart Application", issued on May 8, 2023, pp. 1-9.
"Office Action of China Counterpart Application", issued on Jan. 23, 2025, with English translation thereof, p. 1-p. 9.
"Office Action of Europe Counterpart Application", issued on Apr. 22, 2025, p. 1-p. 4.

* cited by examiner

FILLER PIECE MOUNTING ASSEMBLY FOR LIFTING COLUMN AND LIFTING COLUMN

CROSS-REFERENCE TO RELATED APPLICATION

This application is a 371 of international application of PCT application serial no. PCT/CN2021/088229, filed on Apr. 19, 2021, which claims the priority benefit of China application no. 202010384859.2, filed on May 9, 2020. The entirety of each of the above mentioned patent applications is hereby incorporated by reference herein and made a part of this specification.

FIELD

The present invention relates to the technical field of lifting columns, in particular to a filler piece mounting assembly for a lifting column and a lifting column.

BACKGROUND

As people sit at work longer and longer, they gradually realize that sedentary work is not conducive to health and work efficiency, the use of a height adjustable desk to sit and stand alternately has become a popular health working way. The height adjustable desk is provided with a lifting column at a bottom. The lifting column includes two or more casings that are snapped with each other. In order to ensure strength and rigidity of the lifting column, casing is generally made of metal, and a clearance is left between two adjacent casings in order to avoid serious wear of casing during lifting, however, the clearance will cause problems such as shaking and jamming when two parts move relatively, but also cause the assembly position to deviate from the ideal position in the subsequent assembly, which increases the difficulty of subsequent assembly. At present, a slider with corresponding thickness is used between two casings to compensate the clearance. Different clearances require different slider sizes, thus a variety of specifications of sliders need to be prepared so that the universality is poor, and the production and management costs are increased. Also, debugging option is required during installation to select the slider with the most suitable thickness, which brings a lot of inconvenience to the installation and reduces the assembly efficiency. Moreover, there are errors in the casing machining process, through process control, the error of the two can only be controlled within a certain tolerance range, but cannot be controlled to a certain value, so it is difficult to match a completely suitable slider, which affects the stability of the lifting column during operation.

SUMMARY

The technical problem to be solved by the present invention is to overcome the deficiency in the prior art, and to design a filler piece mounting assembly for a lifting column with strong universality and improved stability.

To solve the above technical problems, the present invention adopts the following technical solution:

A filler piece mounting assembly for a lifting column is provided, the lifting column includes a first casing and a second casing sliding in the first casing, the filler piece mounting assembly includes a resilient filler piece and a fixed frame for fixing the resilient filler piece, the resilient filler piece is disposed outside an outer wall of the second casing and axially fixed relative to the first casing piece, the fixed frame is disposed at a front end of the first casing and moves relative to the first casing, a first inclined surface is disposed on an outside of the resilient filler piece, the fixed frame includes an extrusion part for extruding the first inclined surface, and the extrusion part extrudes the first inclined surface to radially deform the resilient filler piece to adjust a clearance between the resilient filler piece and the second casing.

By adopting the technical solution, the present invention has the beneficial effects that:

The filler piece mounting assembly in this solution, by adjusting the tightness of the connection between the fixed frame and the first casing, achieves different degrees of extrusion fit between the fixed frame and the resilient filler piece, thereby compensating different clearances. The resilient filler piece is thick near the first casing and progressively thinner away from the first casing. Therefore, when the fixed frame moves in the direction of the first casing, the extrusion part is driven to move in the direction of the first casing to extrude the first inclined surface. The farther the fixed frame moves, the greater the pressure applied to the first inclined surface is. The larger the radial deformation of the resilient filler piece is, the closer the contact with the second casing. Therefore, the filler piece mounting assembly of one specification in the solution can be applied to a larger compensation range of the clearance, and has strong universality. In a certain clearance range, there is no need to prepare filler pieces with various thicknesses and sizes according to different clearances, thus saving processing and management costs.

The filler piece mounting assembly in this solution can adjust the clearance between the first casing and the second casing by means of the elastic deformation of the resilient filler piece, so as to make up the error produced in the course of processing, achieve the best compensation effect, improve the stability of the lifting column during operation, do not need to debug and select for many times before assembly, and can be adjusted according to needs after assembly, thereby improving the assembly efficiency.

By adopting the filler piece mounting assembly in the solution, the fixed frame plays dual roles of extruding the first inclined surface to adjust deformation and achieving the fixed connection with the first casing, and does not need to additionally provide a fixed connection structure between the resilient filler piece and the first casing, which simplifies the structure, saves the material and mold processing cost and expands the application range.

Preferably, the extrusion part is provided with a second inclined surface fitting with the first inclined surface.

Preferably, the first inclined surface is progressively contracted along an extending direction of the second casing, and the second inclined surface is progressively contracted along a retracting direction of the second casing.

Preferably, the filler piece mounting assembly further includes a fixing ring for fixing the resilient filler piece.

Preferably, the first casing is provided with a limiting part for limiting the fixing ring.

Preferably, a plurality of resilient filler pieces are disposed outside the second casing, and the plurality of resilient filler pieces are distributed along a circumferential direction of the fixing ring.

Preferably, an outer diameter of the fixing ring is larger than an inner diameter of the first casing, and the fixing ring is abutted at the front end of the first casing; or the fixing ring is located in the first casing, and the first casing is provided with a limiting convex ring for limiting the fixing ring; or the fixing ring is located in the first casing, and the first casing is provided with a guide bump extending along an axial direction of the first casing, and the fixing ring abuts against a top end of the guide bump.

Preferably, the fixed frame further includes a connecting part, an inner wall of the connecting part is provided with an internal thread, and the front end of the first casing is provided with an external thread fitting with the internal thread.

Preferably, the fixed frame further includes a connecting part provided with resilient snaps on an inner wall, the first casing is provided with a plurality of snap holes fitting with the resilient snaps, and the snap holes are axially distributed along the first casing.

Another technical solution adopted by the present invention is as follows:

A lifting column includes, sequentially snapped from outside to inside, an outer pipe, a middle pipe and an inner pipe, the filler piece mounting assembly for the lifting column described in either of the above technical solutions is provided between the outer pipe and the inner pipe and between the middle pipe and the inner pipe.

These features and advantages of the invention will be disclosed in detail in the following detailed description of the embodiment and the appended drawings.

BRIEF DESCRIPTION OF THE DRAWINGS

The present invention is further explained below with reference to the accompanying drawings.

DETAILED DESCRIPTION

The technical solutions of the embodiments of the present invention are explained and illustrated below in conjunction with the accompanying drawings of the embodiments of the present invention, but the following embodiments are only preferred embodiments, not all of them. Based on the embodiments in the implementations, all other embodiments obtained by those skilled in the art without making creative efforts are within the scope of protection of the present invention.

In the description of the present invention, it should be understood that orientation or positional relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counter-clockwise", etc. are based on the orientation or positional relationships shown in the drawings, for ease of description of the present invention and simplification of the description only, these terms do not indicate or imply that the apparatus or element referred to must have a specific orientation or be constructed and operated in a specific orientation, and therefore cannot be construed as limitations to the present invention.

In addition, the terms of "first", "second" are for descriptive purposes only and cannot be construed as indicating or implying relative importance or implying the number of the indicated technical features. Thus, features defined with "first" and "second" may explicitly or implicitly include one or more of the features. In the description of the present invention, "multiple" means two or more unless otherwise expressly specified.

In the present invention, unless otherwise expressly specified and limited, the terms "mounted", "coupled", "connect", "fixed", etc. should be understood in a broad sense, for example, they can be fixed connections, detachable connections or integral connections; mechanical connections or electrical connections; and direct connections or indirect connections through an intermediate medium, or can be the internal connectivity of two elements. For those ordinarily skilled in the art, the specific meanings of the above terms in the present invention will be understood according to the specific circumstances.

In the present invention, unless otherwise expressly specified and limited, the first feature "on" or "under" the second feature may include direct contact between the first and second features, or it may include indirect contact between the first and second features through a separate feature between them. Moreover, the first feature is "over", "above" and "on" the second feature may include the first feature being directly above and diagonally above the second feature, or simply indicates that a horizontal height of the first feature is higher than that of the second feature. The first feature is "under", "underneath" and "below" the second feature may include the first feature being directly below and diagonally below the second feature, or simply indicates that the horizontal height of the first feature is less than that of the second feature.

Embodiment I

As shown in FIGS. 2 to 8, a filler piece mounting assembly for a lifting column is provided. The lifting column includes a first casing and a second casing sliding in the first casing. The filler piece mounting assembly includes a resilient filler piece 1 and a fixed frame 2 for fixing the resilient filler piece 1. The resilient filler piece 1 is disposed outside an outer wall of the second casing and axially fixed relative to the first casing. The fixed frame 2 is disposed at a front end of the first casing and moves relative to the first casing. A first inclined surface 101 is disposed on an outside of the resilient filler piece 1. The fixed frame 2 includes an extrusion part 201 for extruding the first inclined surface 101, and the extrusion part 201 extrudes the first inclined surface 101 to radially deform the resilient filler piece 1 to adjust a clearance 004 between the resilient filler piece 1 and the second casing.

When the second casing expands and contracts in the first casing, the ideal clearance 004 between the resilient filler piece 1 and the outer wall of the second casing is zero in order to reduce friction energy consumption and ensure stability during expansion and contraction. But in the actual operation process, it is difficult to control the value accurately. Therefore, the resilient filler piece 1 will have made contact or even an interference fit with the outer wall of the second casing. The filler piece mounting assembly in this embodiment, by adjusting the tightness of the connection between the fixed frame 2 and the first casing, achieves different degrees of extrusion fit between the fixed frame 2 and the resilient filler piece 1, thereby compensating different clearances 004. The resilient filler piece 1 is thick near the first casing and progressively thinner away from the first casing. Therefore, when the fixed frame 2 moves in the direction of the first casing, the extrusion part 201 is driven to move in the direction of the first casing to extrude the first inclined surface 101. The farther the fixed frame 2 moves, the greater the pressure applied to the first inclined surface 101 is. The larger the radial deformation of the resilient filler piece 1 is, the closer the contact with the second casing. Therefore, the filler piece mounting assembly of one specification in this embodiment can be applied to a larger compensation range of the clearance 004, and has strong universality. In a certain clearance range, there is no need to prepare filler pieces with various thicknesses and sizes according to different clearances 004, thus saving processing and management costs. The filler piece mounting assembly in this embodiment can adjust the clearance 004 between the first casing and the second casing by means of the elastic deformation of the resilient filler piece 1, so as to make up the error produced in the course of processing, achieve the best compensation effect, improve the stability of the lifting column during operation, do not need to debug and select for many times before assembly, and can be adjusted according to needs after assembly, thereby improving the assembly efficiency. By adopting the filler piece mounting assembly in this embodiment, the fixed frame 2 plays dual roles of extruding the first inclined surface 101 to adjust deformation and achieving the fixed connection with the first casing, and does not need to additionally provide a fixed connection structure between the resilient filler piece 1 and the first casing, which simplifies the structure, saves the material and mold processing cost and expands the application range.

Figure 7:
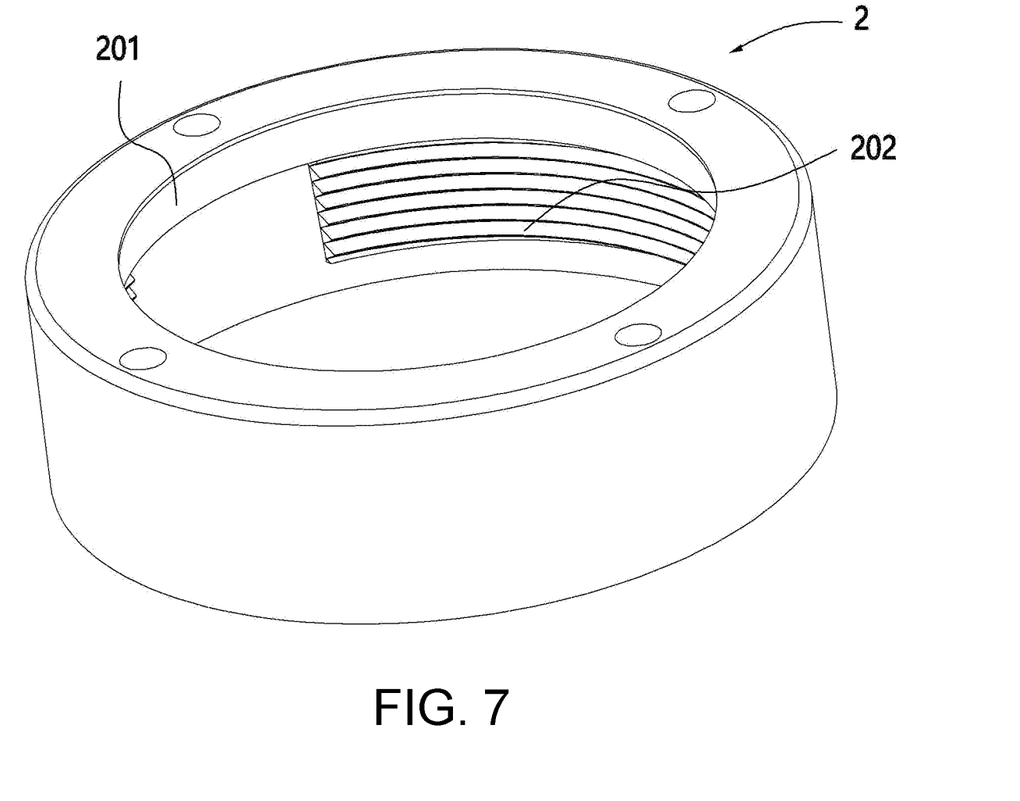
FIG. 7 is a structural stereoscopic diagram of the fixed frame in embodiment I of the present invention.
Figure 8:
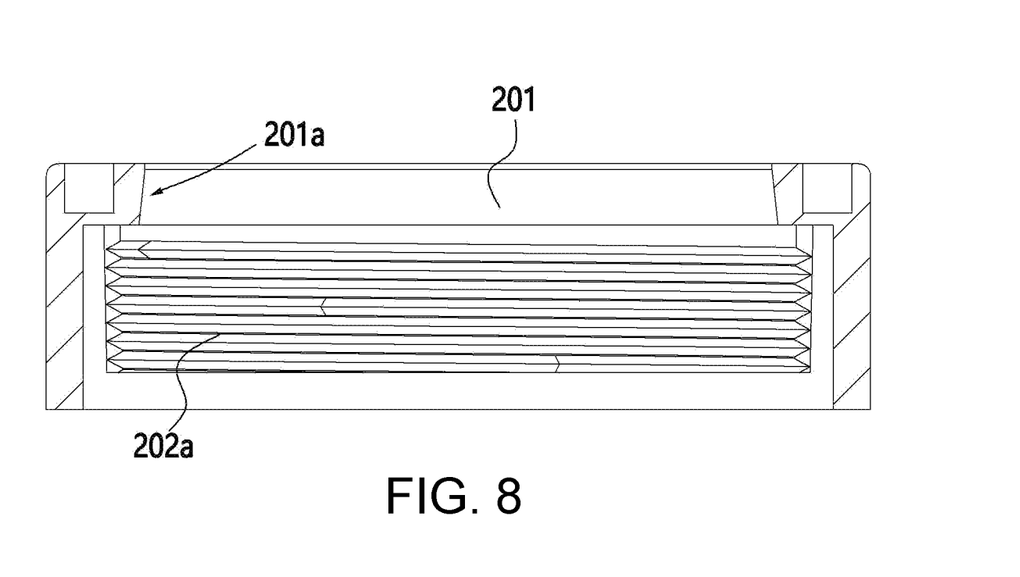
FIG. 8 is a sectional view of the fixed frame in embodiment I of the present invention.

As shown in FIGS. 7 and 8, in order to make the force applied by the extrusion part 201 to the first inclined surface 101 more uniform, the extrusion part 201 is provided with a second inclined surface 201*a* fitted with the first inclined surface 101. The first inclined surface 101 is progressively contracted along an extending direction of the second casing. The second inclined surface 201*a* is progressively contracted in a retracting direction of the second casing. The two inclined surfaces face each other. The resilient filler piece 1 is axially fixed relative to the first casing. Therefore, the farther the extrusion part 201 moves toward the first casing, the greater the extrusion force of the second inclined surface 201*a* against the first inclined surface 101, and the surface contact between the second inclined surface 201*a* and the first inclined surface 101 increases a contact area, and the axial deformation range of the side mating with the second casing is more uniform according to the force conduction, thereby further improving the stability of the second casing during operation.

Figure 3:
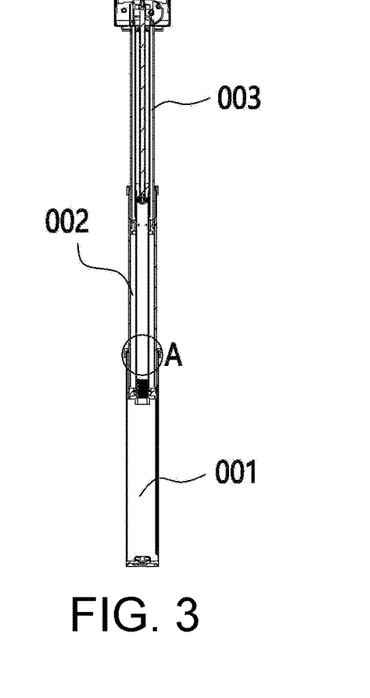
FIG. 3 is a structural sectional view of the lifting column in embodiment I of the present invention.
Figure 4:
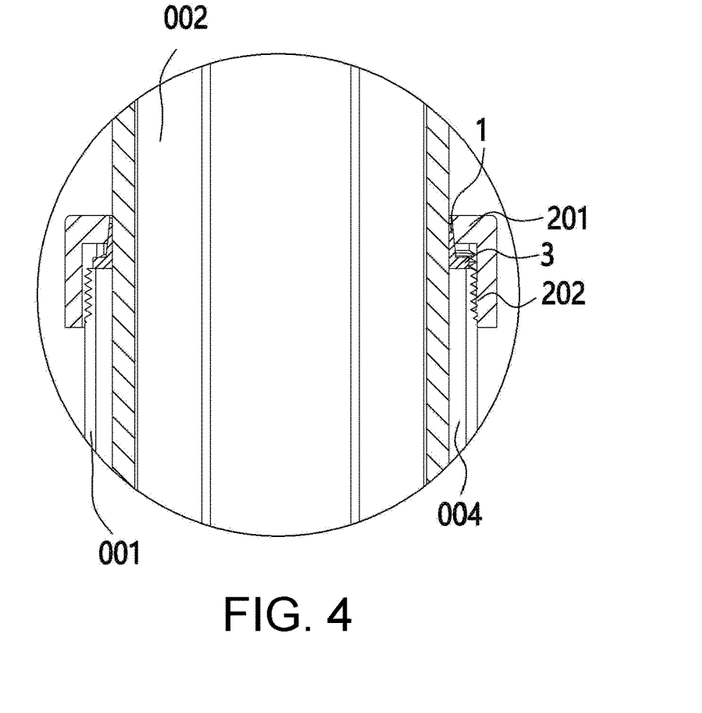
FIG. 4 is an enlarged view of a part A in FIG. 3.
Figure 5:
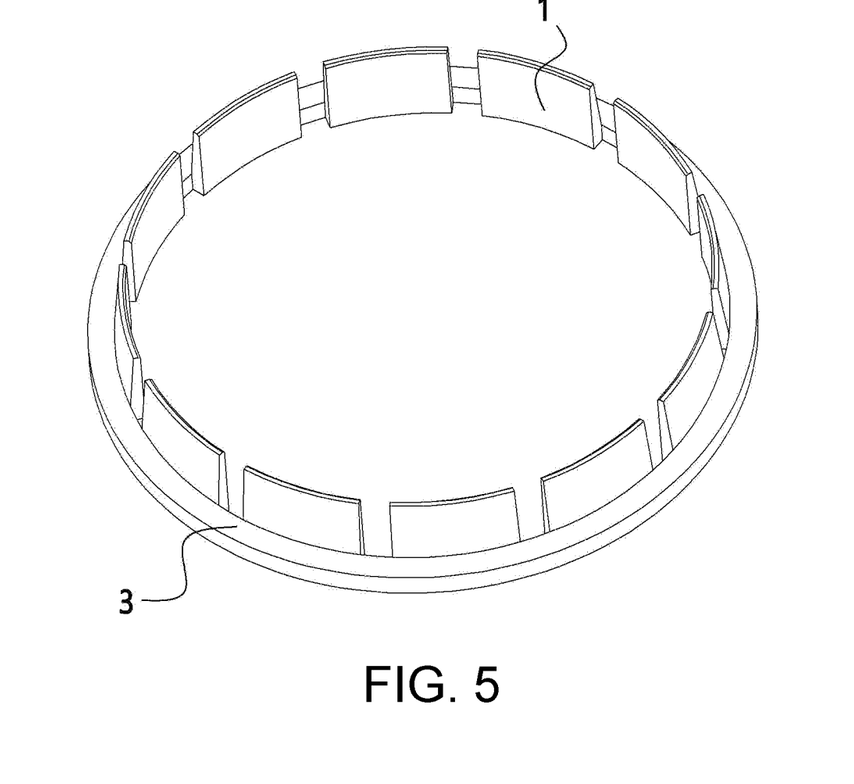
FIG. 5 is a structural stereoscopic diagram of the resilient filler piece fixed on the fixing ring in the present invention.
Figure 6:
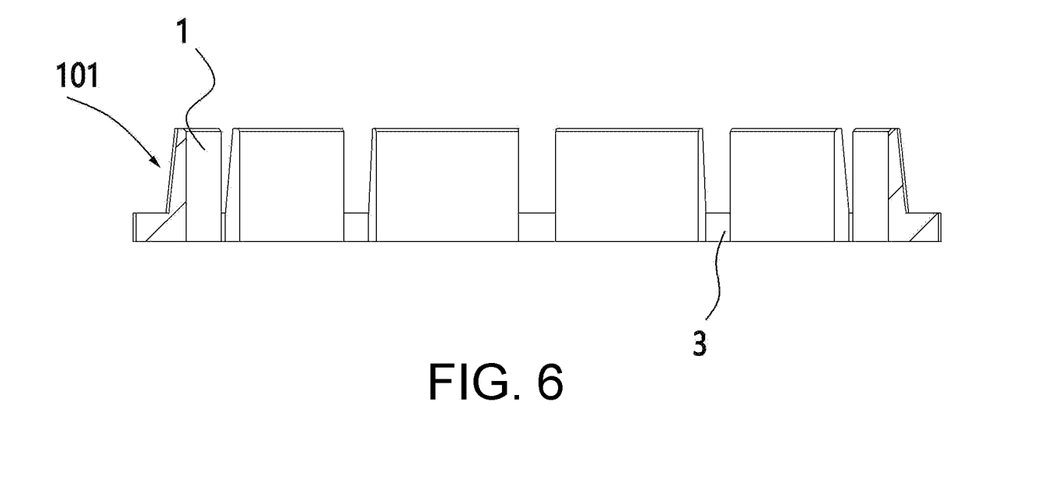
FIG. 6 is a sectional view of the resilient filler piece fixed on the fixing ring in the present invention.

In order to ensure that the stability of each orientation in the telescopic process of the second casing, as shown in FIGS. 5 and 6, a plurality of resilient filler pieces 1 are disposed outside the second casing. The plurality of resilient filler pieces 1 are uniformly distributed along the circumferential direction of the outer wall of the second casing. In order to achieve the axial fixation of the resilient filler piece 1 and the first casing, the filler piece mounting assembly further includes a fixing ring 3 for fixing the resilient filler piece 1. The fixing ring 3 is snapped on the second casing, the plurality of resilient filler pieces 1 are distributed and fixed along the circumferential direction of the fixing ring 3. The first casing is provided with a limiting part for limiting the fixing ring 3. In this embodiment, as shown in FIGS. 3 and 4, the resilient filler piece 1 and the fixing ring 3 can be located outside the first casing, an outer diameter of the fixing ring 3 is larger than an inner diameter of the first casing, and the fixing ring 3 abuts against the front end of the first casing, at which time the front end of the first casing serves as the limiting part.

It can be understood that the fixing ring 3 and some of the resilient filler pieces 1 can also be located in the first casing, in this point, the first casing is provided with a limiting convex ring 4 for limiting the fixing ring 3, and the fixing ring 3 can play a dustproof role while fixing the resilient filler pieces 1.

It can be understood that when the fixing ring 3 and some of the resilient filler pieces 1 are located in the first casing, the first casing is provided with a guide bump extending along an axial direction of the first casing, and the fixing ring 3 abuts against a top end of the guide bump. At this time, in order to prevent the circumferential rotation of the second casing while the second casing slides axially relative to the first casing, a guide sleeve is provided at a bottom end of the second casing, and a guide groove fitting with the guide bump is provided on the guide sleeve.

For the case where all or some of the resilient filler pieces 1 extend outside the first casing, as shown in FIGS. 7 and 8, the extrusion part 201 is located at one end of the fixed frame 2 and is always outside the first casing to extrude some of the resilient filler pieces 1 extending outside.

In order to achieve the connection between the fixed frame 2 and the first casing, as shown in FIGS. 7 and 8, the fixed frame 2 further includes a connecting part 202, an inner wall of the connecting part 202 is provided with an internal thread 202*a*, and a front end of the first casing is provided with an external thread fitting with the internal thread 202*a*, and the stepless regulation of connection and compression is implemented simultaneously through screw thread fit.

It can be understood that the connecting part 202 and the first casing can also be snapped. The connecting part 202 is provided with resilient snaps on an inner wall, and the first casing is provided with a plurality of snap holes fitting with the resilient snaps, and the snap holes are axially distributed along the first casing.

Embodiment II

Figure 9:
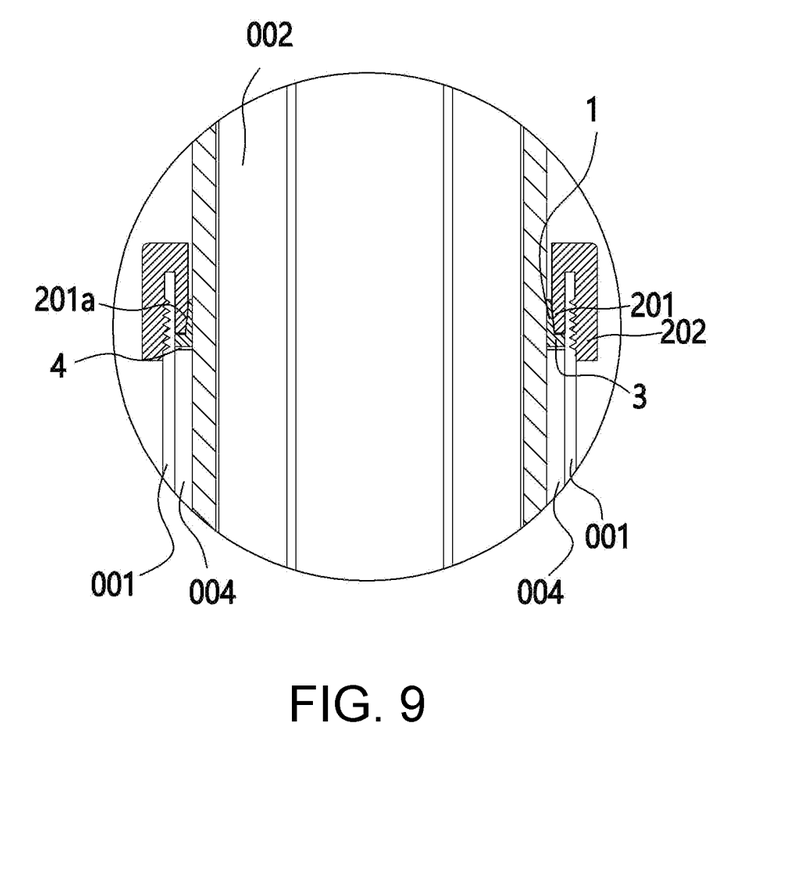
FIG. 9 is a sectional view of the fitting of the filler piece mounting assembly in the second embodiment of the present invention.

As shown in FIG. 9, the difference between this embodiment and embodiment I is that the resilient filler pieces 1 are all disposed in the first casing, a clearance is provided between the extrusion part 201 and the connecting part 202 for clamping the wall of the first casing, the connecting part 202 is connected with the outer wall of the first casing, and the extrusion part 201 extends into the first casing to press the first inclined surface 101.

Embodiment III

Figure 1:
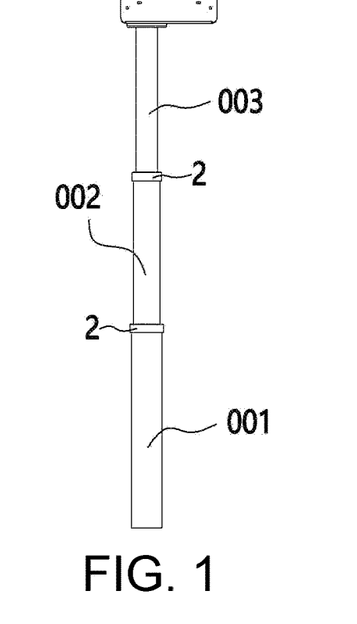
FIG. 1 is a structural schematic diagram of a lifting column of the present invention.
Figure 2:
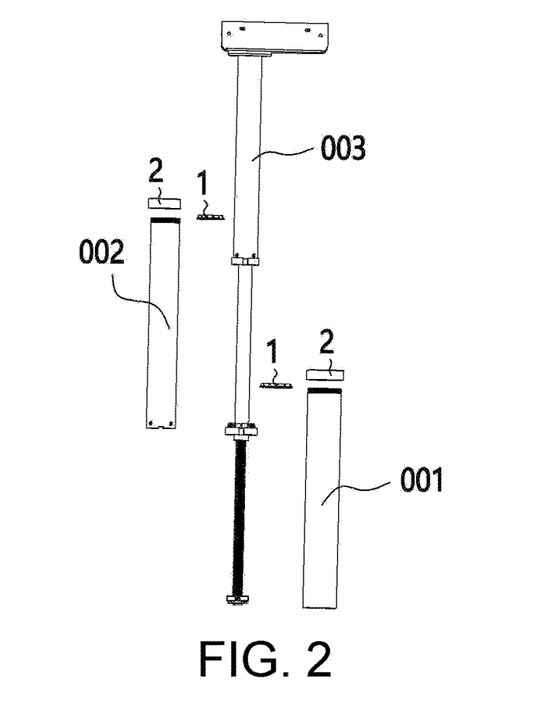
FIG. 2 is a decomposed schematic diagram of the lifting column structure of the present invention.

As shown in FIG. 1, a lifting column is provided, which includes, sequentially snapped from outside to inside, an outer pipe 001, a middle pipe 002 and an inner pipe 003. The filler piece mounting assembly for the lifting column as described in embodiment I or embodiment II is provided between the outer pipe 001 and the inner pipe 003 and between the middle pipe 002 and the inner pipe 003.

The foregoing is intended to be an embodiment of the present invention only, but the scope of protection of the present invention is not limited thereto, and those skilled in the art will appreciate that the present invention includes, but is not limited to, the contents described in the drawings and the above embodiment. Any modifications that do not depart from the functional and structural principles of the present invention will be included within the scope of the claims.

What is claimed is:

1. A filler piece mounting assembly for a lifting column, comprising:
    a first casing; and
    a second casing, slidable within the first casing,
    a plurality of resilient filler pieces fixed to a fixing ring, the plurality of resilient filler pieces and the fixing ring are disposed outside an outer wall of the second casing and axially fixed relative to the first casing,
    a fixed frame for fixing the plurality of resilient filler pieces is disposed at a front end of the first casing and movable relative to the first casing, the plurality of resilient filler pieces collectively define a first inclined surface that is disposed on an outside of the plurality of resilient filler pieces, the fixed frame comprises an extrusion part for extruding the first inclined surface to radially deform the plurality of resilient filler pieces so as to adjust a clearance between the plurality of resilient filler pieces and the second casing,
    wherein the fixed frame further comprises a connecting part,
    wherein the plurality of resilient filler pieces and the fixing ring are all disposed within the first casing,
    wherein a gap is defined between the extrusion part and the connecting part for clamping the fixed frame to the front end of the first casing, the connecting part is connected with an outer wall of the first casing, and the extrusion part extends into the first casing to press against the first inclined surface.

2. The filler piece mounting assembly according to claim 1, wherein the extrusion part is provided with a second inclined surface fitting with the first inclined surface.

3. The filler piece mounting assembly according to claim 2, wherein the first inclined surface is progressively contracted along an extending direction of the second casing, and the second inclined surface is progressively contracted along a retracting direction of the second casing.

4. The filler piece mounting assembly according to claim 1, wherein the first casing is provided with a limiting part for limiting the fixing ring.

5. The filler piece mounting assembly according to claim 4, wherein the plurality of resilient filler pieces are distributed along a circumferential direction of the fixing ring.

6. The filler piece mounting assembly according to claim 5, wherein the fixing ring is located in the first casing, and the first casing is provided with a limiting convex ring for limiting the fixing ring.

7. The filler piece mounting assembly according to claim 4, wherein the fixing ring is located in the first casing, and the first casing is provided with a limiting convex ring for limiting the fixing ring.

8. The filler piece mounting assembly according to claim 1, wherein an inner wall of the connecting part is provided with an internal thread, and the front end of the first casing is provided with an external thread fitting with the internal thread.

9. A lifting column for a height adjustable desk, comprising: sequentially snapped from outside to inside, an outer pipe, a middle pipe and an inner pipe, wherein the filler piece mounting assembly according to claim 1 is provided between each of the outer pipe and the middle pipe, wherein the outer pipe is a first casing and the middle pipe is a second casing, and between the middle pipe and the inner pipe, wherein the middle pipe is a first casing and the inner pipe is a second casing.

10. The lifting column for the height adjustable desk according to claim 9, wherein each extrusion part is provided with a second inclined surface fitting with the first inclined surfaces, respectively.

11. The lifting column for the height adjustable desk according to claim 9, wherein each first inclined surface is progressively contracted along an extending direction of each second casing, respectively, and each second inclined surface is progressively contracted along a retracting direction of each second casing, respectively.

12. The lifting column for the height adjustable desk according to claim 9, wherein each first casing is provided with a limiting part for limiting the respective fixing rings.

13. The lifting column for the height adjustable desk according to claim 9, wherein each of the plurality of resilient filler pieces are distributed along a circumferential direction of the respective fixing rings.

14. The lifting column for the height adjustable desk according to claim 9, wherein each fixing ring is located in the respective first casing, and each first casing is provided with a limiting convex ring for limiting each fixing ring, respectively.

15. The lifting column for the height adjustable desk according to claim 9, wherein an inner wall of each connecting part is provided with an internal thread, and the front end of each first casing is provided with an external thread fitting with the respective internal thread.

* * * * *